Feb. 15, 1938. E. E. TURNER, JR 2,108,090
APPARATUS FOR DISTANCE AND DEPTH MEASUREMENT
Filed July 13, 1933  2 Sheets-Sheet 1
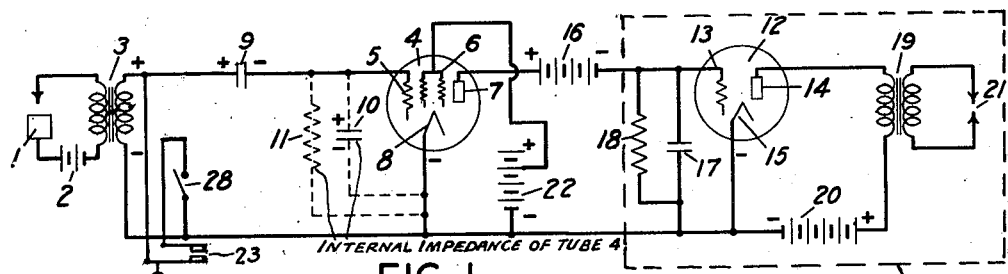
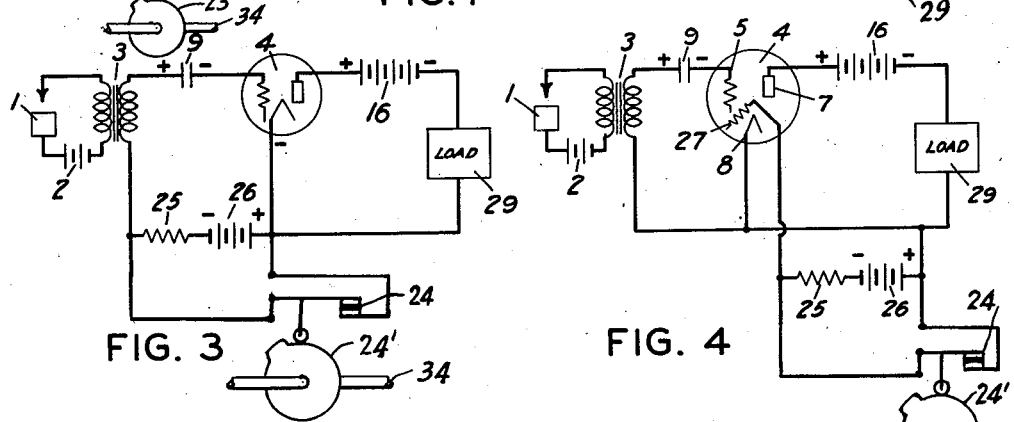
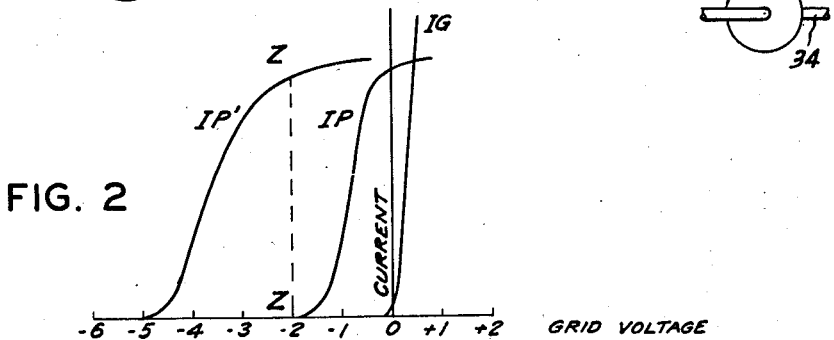
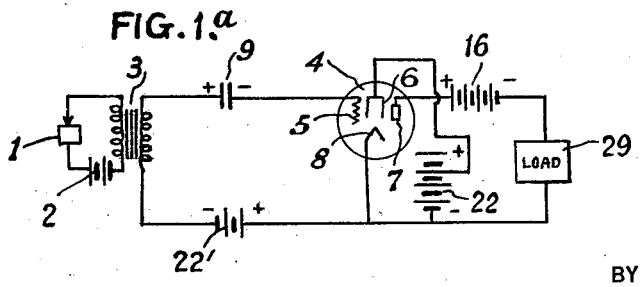
INVENTOR
EDWIN E. TURNER, JR.
BY
Ezekiel Wolf
ATTORNEY Feb. 15, 1938.  E. E. TURNER, JR  2,108,090
APPARATUS FOR DISTANCE AND DEPTH MEASUREMENT
Filed July 13, 1933  2 Sheets-Sheet 2

INVENTOR
EDWIN E. TURNER, JR.
BY
Ezekiel Wolf
ATTORNEY

Patented Feb. 15, 1938

2,108,090

UNITED STATES PATENT OFFICE 2,108,090

APPARATUS FOR DISTANCE AND DEPTH MEASUREMENT

Edwin E. Turner, Jr., West Roxbury, Mass., assignor to Submarine Signal Company, Boston, Mass., a corporation of Maine Application July 13, 1933, Serial No. 680,208

13 Claims. (Cl. 177—386)

The present invention relates to methods and apparatus for measuring distances such as heights and depths.

The present invention is particularly adapted for use in systems for distance measurement by the echo method. According to the echo method a wave-energy impulse is emitted periodically and the echo or the impulse reflected from the object whose distance is to be measured is received and the time interval is measured between the emission of the impulse and the receipt of the reflected impulse. Systems of this type have found particular use for depth sounding. In this case compressional waves are usually employed.

One problem always present in such systems is to insure the operation of the indicating or measuring device by the reflected impulse and to avoid its operation by disturbing impulses. In devices of this nature heretofore employed it has been possible to prevent substantially all indications of disturbing impulses, but a certain measure of manual control has been required. The present invention makes the exclusion of disturbing impulses entirely automatic. Moreover it makes possible a much closer selection between the desired and undesired signal impulses.

Since my invention is especially adaptable to depth sounding, I have described it with reference to systems for this purpose. It is to be understood, however, that it is not limited to use in depth sounding with compressional waves, but that it is also applicable to other systems of distance measurement.

Figure 5:
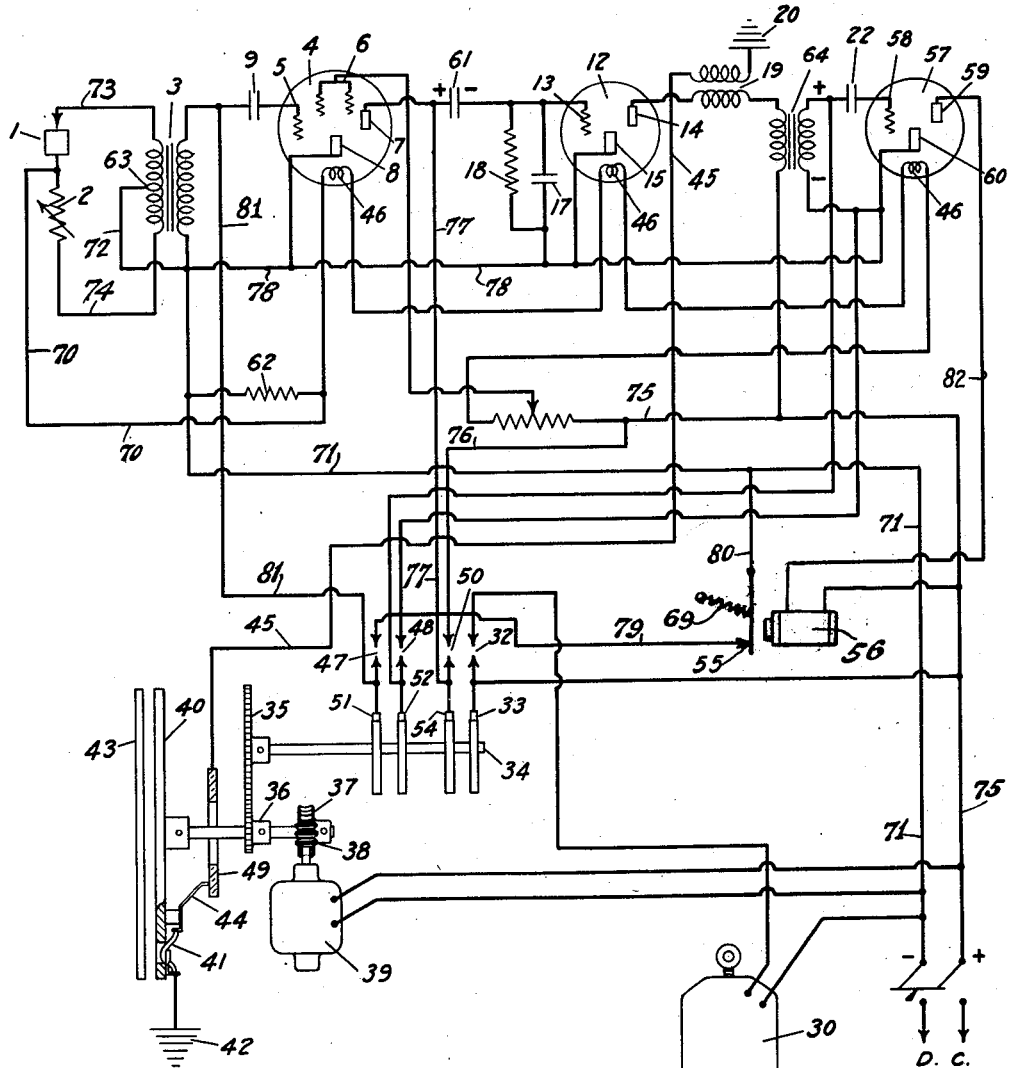
Figure 6:
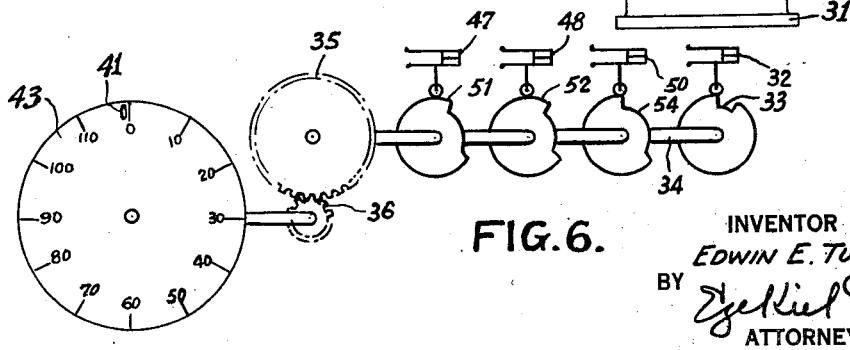

The invention may best be understood from the following description with reference to the drawings in which Fig. 1 is a schematic wiring diagram of one form of the invention; Fig. 2 is an explanatory diagram of conditions existing with reference to one of the vacuum tubes employed; Figs. 1a, 3 and 4 are modifications of the arrangement shown in Fig. 1; Fig. 5 is a schematic diagram showing the application of my invention to a complete depth-indicating system; and Fig. 6 is a diagrammatical representation showing the relative positions of the contact-operating cams in Fig. 5.

Depth sounding systems which have in the past attained any substantial commercial success have employed a compressional wave transmitter and receiver, an indicator for indicating the receipt of a reflected impulse and a vacuum tube circuit for operating the indicator. A system of this type is shown in United States Patent No. 1,667,540, dated April 24, 1928. According to this patent selection between the echo to be received and the disturbing water noises was made chiefly by relying upon the tuning of the signal and the corresponding tuning of the receiving circuit. I prefer, however, to depend for the selection of the reflected impulse upon the relative intensities of the reflected impulse and the disturbing noises.

Such a system is shown in my United States Patent No. 2,033,160, issued March 10, 1936. In these systems I have employed for a wave energy source for the signal impulse a so-called impact oscillator which produces a compressional wave impulse having a great intensity. The reflected wave is received by a sound receiver such as a microphone and the electrical impulse produced thereby is passed through a transformer to a vacuum tube circuit which causes the operation of an indicator. In these prior systems I exclude disturbing noises by providing a negative biasing potential on the grid of the first vacuum tube in the receiving circuit. This biasing potential prevents plate current from flowing in the tube unless the received impulse produces a positive potential of a sufficiently high value to overcome the negative bias. Since the disturbing noises remain at substantially a uniform level for considerable periods of time, the biasing potential may be set high enough to prevent plate current from flowing in the vacuum tube when the receiver is agitated by disturbing noises. Since the signal produced by the impact oscillator has an intensity such that the returning echo has an intensity greater than that of the water noises, the indicator will be operated by the echo and not by the disturbing noises. Of course, as the vessel on which the apparatus is installed moves into deeper depths, or vice versa, the relative intensity of the water noises and the echo may change. However, so long as the echo impulse has a greater intensity than the water noise, it will be received and operate the indicator while the water noise will not operate the indicator.

Obviously it is advantageous in such arrangements to operate the indicator by means of the very peak of the reflected signal impulse in order to exclude the maximum possible number of extraneous noises. In shallow water the echo impulse is usually very much stronger than the water noise, while in deeper water the echo impulse and the disturbing noises approach each other in intensity.

In the systems shown in my copending applications I provided a control in the microphone circuit which made it possible to vary the sensitivity of the whole receiving circuit. It will be obvious, however, that such a control varied the effect of both the echo impulse and the disturbing noises upon the receiving circuit to the same extent. Thus with a definite biasing potential it was necessary to change the hydrophone current as the vessel proceeded into shallower or deeper water. These adjustments were not so frequent but what the ship's personnel could care for them, yet at the same time they were quite inconvenient.

In addition, when the arrangement was employed to operate a recording device, as, for example, that shown in my copending application Serial No. 561,213, filed September 4, 1931, the instrument could not be left running for any length of time without attention from time to time.

By the present invention I eliminate all these difficulties and completely eliminate any necessity for manually adjusting the indicating or recording apparatus regardless of the depth of water in which the ship may find itself and regardless of the relative intensities of the water noise with respect to the returning echo, provided the latter is the greater.

I furthermore provide an arrangement whereby the signal impulse which travels directly from the sound emitter to the receiver does not produce an operation of the indicator or of the recorder.

In Fig. 1 only the receiving circuit is shown. The sound waves which are present in the field are received by the receiver 1 which may be a microphone through which current passes from the battery 2 through the primary of transformer 3. A change in the current through the microphone produces a potential across the secondary of transformer 3 which is impressed between the grid 5 and the filament 8 of the vacuum tube 4. With a compressional wave of the impact type a suitable polarity may be chosen for the battery 2 so that the greatest voltage appearing across the secondary of transformer 3 will be in such a direction as to make the grid side of the secondary positive and the filament side negative. Under these conditions this voltage will appear in part across the condenser 9 which is in series with the secondary of transformer 3 and the grid 5 and in part across the inter-electrode capacitance 10 of the vacuum tube 4 shown dotted in Fig. 1. The capacitance 10 is in series with the condenser 9. Therefore, since the capacitance 10 is very small compared with the capacity of condenser 9, the voltage across the secondary of transformer 3 will divide and the majority of the potential will appear across 10 the smaller condenser with the polarity shown.

The grid of tube 4 is accordingly made positive by practically the full value of the potential appearing across the secondary of the transformer 3. However, the grid to filament circuit within tube 4 comprises a capacity reactance only when the voltage of the grid 5 is negative with respect to the filament 8. The conductance of the path between these two elements with these conditions is substantially zero. The instant the grid voltage becomes positive, the capacitance 10 is shunted by a conductance 11 shown dotted in Fig. 1 contingent upon electron flow from the filament to the grid.

In Fig. 2 the curve IG shows a graph of the varying values of this grid current with varying values of grid voltage. Examination of this curve will show that the conductance between the filament and the grid reaches a relatively high value for grid voltages only slightly positive with respect to the axis of zero grid voltage. Under these conditions, at all voltages more positive than that of zero grid voltage, the capacitance 10 is shunted by the grid conductance. Whereas so long as the grid is negative practically none of the voltage drop produced across the secondary of transformer 3 by the incoming signal appears across condenser 9, the reverse is true when the grid 5 becomes positive with respect to the filament 8. Under the latter conditions a large part of the voltage drop appears across condenser 9 which accordingly charges up in such a direction as to make the grid side of the condenser negative. In other words, electrons flow from the filament 8 to the grid 5 and are trapped on the grid making it negative.

Under the repeated stimulus of several impulses of a given maximum or peak value, the condenser 9 will eventually charge up to the value of this peak voltage. If 9 has a low value of capacity, it becomes charged very quickly and may even become fully charged when a single echo is received. When the condenser 9 is once charged to a potential sufficient to inhibit the flow of current in the plate circuit of tube 4, the circuit is in condition for continued operation. The operation of the remainder of the circuit is similar to that shown in my above-mentioned Patent No. 2,033,160.

A second vacuum tube 12 having a grid 13, a plate 14 and a filament 15 is coupled on its input side to the plate circuit of tube 4 through the battery 16. Across the grid 13 and the filament 15 there is a small condenser 17 in parallel with which is a high resistance 18. The output circuit of tube 12 contains the primary of the transformer 19 and a battery 20. The secondary of transformer 19 operates an indicator 21. This indicator may be a gaseous discharge tube such as that shown in the United States Patent No. 1,667,540 or if desired the marking element of a recorder may be substituted for the transformer 19 and indicator 21. If now a signal is received by the hydrophone 1 which produces a voltage across the secondary of transformer 3 great enough to overcome the negative biasing potential upon grid 5 due to the charge on condenser 9 placed there by some preceding impulse, a current will flow in the plate circuit of tube 4, thereby placing a negative charge on the grid 13 of tube 12, cutting off the plate current flowing in this tube through transformer 19 and inducing a high voltage in the secondary of transformer 19 and across the discharge tube indicator 21, thereby causing the latter to become illuminated and to indicate the receipt of the signal impulse.

It will be observed that there is a change in the distribution of voltage across condenser 9 and the inter-electrode capacitance 10 as the grid voltage passes through zero value. The characteristics of the vacuum tube 4 and its attendant circuits are so chosen that at the value of zero grid voltage passing from a negative value to a positive value of grid voltage, almost the entire voltage of the battery 16 in the plate circuit of tube 4 appears across the high resistance grid leak 18 in the grid circuit of tube 12. In other words, maximum plate current in the tube 4 is caused to flow before grid current starts to flow in this tube as indicated in Fig. 2. The best condition is such that the upper point of inflection of the plate current grid voltage curve IP occurs before the grid current reaches an appreciable value. This insures the cutting off of the plate current of tube 12 and the consequent operation of the indicator 21 before grid current starts to flow in the tube 4 and, therefore, before condenser 9 starts to accumulate its charge. It will be evident that when the device is initially operated, grid current will flow in tube 4, charging the condenser 9 during the positive peaks of received signals.

Condenser 9 will accumulate a charge which causes the operating grid voltage of tube 4 to become more and more negative. If the excitation is sufficient, the operating bias point will be made continuously more negative until the plate current of the tube 4 is reduced to zero, at which time the plate current of tube 12 is permitted to build up and the system is ready for operation as outlined above. Experience has shown that there is on board ship almost always sufficient water noise to excite the hydrophone to a sufficient degree to establish the minimum bias on grid 5 to cut off the plate current in tube 4 and accordingly to make the system operative as soon as it is desired to take a sounding.

It will be obvious that upon repeated signals arriving at the hydrophone, the condenser 9 will continue to become more highly charged so long as the intensity of the incoming signal produces across the secondary of transformer 3 a voltage sufficiently greater than the charge then existing on condenser 9 to cause grid current to flow in the grid-filament circuit of tube 4. Eventually, however, a point will be reached where the received echo is of an intensity such that the maximum voltage developed across the secondary of transformer 3 will be just equal to the charge on condenser 9. Under these conditions the echo impulse will be able to produce a flow of plate current in tube 4 although no appreciable grid current will flow. The indicator will, therefore, be operated with each successive echo impulse so long as the returning echoes have an intensity corresponding to the charge on condenser 9. Thus, the greater the intensity of the received echo, the greater will be the negative bias on tube 4, and consequently the greater also must be any succeeding signal be in order to operate the indicator.

Since there is always some leakage naturally in the grid filament circuit of tube 4, the charge on condenser 9 tends slowly to leak off so that if for any reason the echo impulses become of lesser intensity, the bias will gradually decrease until the reduced intensity of the echo impulses is sufficient again to operate the indicator and to tend to produce grid current flow in the tube 4. Thus, the circuit at all times automatically adjusts itself to receive the echo impulse and to prevent the maximum number of disturbing noises from operating the indicator. These effects transpire with a surprising degree of exactness and it appears that the adjustment by this arrangement is more perfect than that which can be attained by hand where the microphone current is varied by means of a hand-operated potentiometer.

As stated above, the characteristics of the tube 4 and its attendant circuits should be such that the upper point of inflection of the plate current-grid voltage curve occurs just before a substantial amount of grid current flows in the grid circuit of this tube. This condition is, however, largely determined by the parameters of the vacuum tube being used. It is accordingly often difficult to find a tube having the desired characteristics. I have found, however, that a screen-grid tube may be used to overcome this difficulty.

If an adjustable positive potential is applied between the screen grid and the filament of the tube, the characteristics of the tube may in effect be changed so that it is possible to obtain a maximum plate current at the point where grid current starts to increase rapidly. For example, in Fig. 2, if the tube normally has the plate current-grid voltage characteristic IP', which is usually not desirable for the operation of the present system, this characteristic by the proper choice of the positive potential of the screen grid 6 may be shifted to occupy substantially the position IP which is the desired position.

It will be evident from Fig. 2 that with a tube having the characteristic IP, signals having a value less than that represented by the distance between the point Z and a point slightly to the left of the zero axis of grid voltage may be too small to cause grid current to flow. Consequently the condenser 9 will not become charged, or if it has been charged, the charge will leak off entirely so that plate current in the tube 4 will flow at all times, thereby rendering the whole system inoperative. Therefore, it follows that there is a definite signal strength below which no indications will be produced. However, this is not a disadvantage because the hydrophone circuit is in practice adjusted so that the normal water noise on the ship will be just sufficient to insure grid current flow when there is no bias on the grid, and the transmitted signal is made of sufficient intensity so that the echo will have an intensity greater than that of the normal water noise. Thus, the arrangement will operate to indicate the arrival of all signals having an intensity at least slightly greater than the normal water noise and equal to or greater than the strongest impulse received in a preceding sounding cycle.

If at times, such as in conditions of very bad weather, occasional disturbing noises may occur which have an intensity greater than the echo at the depth in question, it may be desirable to permit the disturbing noises which are stronger than the echo to be indicated without cutting out the succeeding echo. In this case it may be desirable to adjust the screen grid voltage provided by battery 22 so that the characteristic of tube 4 is somewhere between IP' and IP and then to provide a small negative biasing battery 22', Fig. 1a, between the filament 8 and the secondary of transformer 3. This will have the effect of admitting all signals having an intensity within a certain range having a maximum value equal to that of the peak value of the strongest impulse and a minimum value somewhat less than this value. A condition which requires this arrangement is, however, very seldom met with in practice. As stated above, when operating tube 4 with a characteristic such as IP, the strongest signal received in each sounding cycle sets the bias on tube 4 to a value corresponding to the intensity of that signal. It will be evident that in the event that the direct signal at the receiver should be stronger than that of the echo, the latter will not produce an operation of the indicator. The strength of the direct signal at the receiver is to a great extent dependent upon the conditions on the ship on which the apparatus is installed. At some depths, however, which is usually well within the range for which the apparatus should operate, the direct signal will become equal in intensity to the echo and at greater depths will surpass it in intensity. If the receiver be mounted close to the transmitter on the ship, the direct signal at the receiver will, of course, always be greater than the echo. However, in most cases the signal transmitter and the receiver are separated on the ship by a considerable distance so that the direct signal which passes to the receiver through the ship's skin or through the water in immediate contact with the ship's skin is usually weaker than the echo returning from the sea bottom in shallow water. When the direct signal is stronger at the receiver than the echo, the direct signal will set the bias on tube 4 and prevent the echo from producing an indication. Consequently it is necessary to eliminate the effect of the direct signal upon the receiving circuit in water deeper than the depth at which the direct signal and echo become equal in intensity.

In Fig. 1 a set of contacts 23 is provided which when closed short circuit the secondary of transformer 3 and prevent any incoming impulse from operating the receiving circuit. These contacts may be operated by a cam 23' connected by shaft 34 to the arrangement which periodically sends out the initial signal. It is necessary to close contacts 23 until just after the direct signal ceases to agitate the microphone 1. While this arrangement makes the system, as an automatic system, inoperative for very small depths, say, up to 5 fathoms, it nevertheless permits the use of complete automatic sensitivity control in greater depths. However, by opening the switch 28, the operator may obtain soundings even between zero and, say, five fathoms, at which the contacts 23 are designed to open since in these depths the echo is stronger than the direct per se.

Alternative arrangements for preventing the direct signal from operating the indicator and from setting the bias on tube 4 when the direct signal is stronger at the receiver than the echo are shown in Figures 3 and 4. In these figures only the first vacuum tube has been shown. The remainder of the circuit corresponding to the tube 12 and its attendant circuits in Fig. 1 are shown in Figs. 3 and 4 as a load 29. It should be noted, however, that for good operation of the vacuum tube 4, the impedance of the load should be high compared to the plate resistance of tube 4.

In Fig. 3 a contact 24 is provided which is operated by cam 24' rotated through shaft 34 by the signal sending device to remain open in shallow depths while the direct signal is being received at the receiver and to remain closed at all other times. This has the effect of placing a high negative bias from the battery 26 through the resistance 25 on the grid of tube 4 while the direct signal is being received at the receiver. Consequently the direct signal, even though it is stronger than the echo, must overcome this high negative bias in order to increase the charge on condenser 9, but when the echo returns, the bias will have been removed by the closing of contacts 24 so that the echo may freely actuate the receiving circuit.

In Fig. 4 the tube 4 is provided with a second control grid 27 to which the high negative bias is applied by the opening of contacts 24 by cam 24' rotated through shaft 34 by the signal sending device while the direct signal is being received at the receiver in a manner similar to that shown in Fig. 3. With both Figures 3 and 4 a screen-grid tube may, of course, be employed, if desired, in the same manner as in Fig. 1.

An example of the application of my invention to a complete depth-sounding system is shown in Fig. 5. Fig. 5, moreover, also shows certain other modifications of the invention in addition to those shown in Figs. 1, 3, and 4. It is to be understood, however, that any of the arrangements shown in Fig. 1, 3 or 4 may be employed in place of the arrangement shown in Fig. 5, if desired.

In Fig. 5 the direct signal is sent out by the impact oscillator 30. The oscillator 30 may be of the type in which a magnetic hammer strikes a diaphragm 31 under the action of a spring. The striking element is then pulled up against the spring by an electromagnet supplied with current upon the closing of the contacts 32 by the cam 33 which is fixed to the shaft 34 and rotated through the gears 35, 36, 37 and 38 by the motor 39. When the cam 33 again permits the contacts 32 to open, another signal is emitted by the oscillator 30. The reflected signal or echo is received by the microphone 1 which is supplied with current from the direct-current supply by being connected across the resistance 62 which, in series with the heaters 46 of the vacuum tubes, is connected across the direct-current supply. In the microphone circuit there is provided a variable resistance 2 which serves to permit initial regulation of the microphone current in accordance with the voltage of the direct-current supply. The current from the potentiometer 62 passes through two circuits. The first circuit can be traced from the left end of potentiometer 62 through conductor 71, conductor 72, to center tap connection 63, the upper half of the primary of transformer 3, conductor 73 to the microphone 1 and thence back to the right end of potentiometer 62 by means of conductor 70. The second circuit can be traced from the left end of potentiometer 62 through conductors 71 and 72 to the center tap connection 63, the lower half of the primary of transformer 3, conductor 74, to resistance 2 and back to the right hand of potentiometer 62 by means of conductor 70. It will be noted that the current to the microphone from the potentiometer 62 is conducted through the primary of transformer 3 in two directions by means of the center tap connection 63 so that voltage fluctuations in the direct-current supply will not induce any voltage in the secondary of transformer 3.

However, an incoming signal impulse by varying the resistance of microphone 1 varies the current flowing through the upper half of the primary of transformer 3, thereby inducing corresponding voltage variations in the secondary of this transformer.

The microphone current, being varied by the incoming reflected signal impulse, causes the current in the primary of transformer 3 also to vary and to produce a voltage across the secondary of the transformer. As in the previous figures this voltage, when sufficiently high to overcome any negative bias on the tube 4 provided by the condenser 9, causes an increase in the plate current of tube 4 and cuts off the plate current already flowing in the plate circuit of tube 12, thereby operating the indicator 41 through the transformer 19 and the grounds 20 and 42, the brush 44 which bears upon conducting ring 49 connected through the lead 45 back to the other side of the secondary of transformer 19. If the potential developed across the secondary of transformer 3 by the incoming signal is sufficiently large, grid current will flow in tube 4 and the condenser 9 will become charged to a higher potential, thereby placing a negative charge on the grid 5 and requiring the next signal to be received to have a correspondingly high intensity in order to operate the indicator. The operation of the circuit in this respect is similar to that shown in Fig. 1.

It will be noted, however, that in Fig. 5 the vacuum tubes 4 and 12 are of the heater type in which the cathodes 8 and 15 are activated by the heaters 46 which are supplied with current directly from the direct-current supply. It is possible with this arrangement to avoid using a number of independent batteries.

In Fig. 5 the interstage battery 16 of Fig. 1 has been replaced by a condenser 61. The condenser 61 is charged by being connected across the direct-current supply through the grid leak 18, conductors 78, 71, 75, 76 and contacts 50 which are closed at all times except during the sounding revolution of the indicator. During the sounding revolution the condenser, being fully charged, provides the proper plate voltage for the tube 4 so that when a signal is received, current may flow in the plate circuit of tube 4 producing a potential across the resistance 18 and making the grid 13 of tube 12 negative to cut off the plate current in this tube in a manner similar to that described with reference to Fig. 1. It will be noted that not only is the use of the condenser advantageous in order to eliminate the necessity for separate anode batteries, but also by virtue of the action of the contacts 50, the anode 7 of the tube 4 is always connected to the direct-current line except during the sounding revolution of the indicator 41 and, consequently, no false indications can be received during this interval.

It is to be understood, of course, that the indicator 41 which is mounted on the disk 40 which is rotated by a motor 39 may make more than one revolution between successive emitted signals. By a sounding revolution I mean the angular distance travelled by the indicator 41 during the time between its passage past the zero point on the scale 43 and its passage past the full scale mark. This angular distance may, of course, be more or less than 360° depending upon the calibration of the scale 43.

The system shown in Fig. 5 requires no manual adjustment whatever to make possible soundings between zero and full-scale depths, and, furthermore, the bias on tube 4 is at all times set by the echo at its optimum value automatically and consequently the selection of the echo from disturbing noises is also made automatically throughout the full scale of the instrument. However, this requires that the direct signal be prevented from affecting the receiving circuit when soundings are being taken in depths in which the direct signal at the receiver is stronger than the returning echo. This is accomplished automatically as follows:

Contacts 47, which correspond to contacts 23 in Fig. 1, are closed by the cam 51 just before the indicator 41 reaches the zero mark in the sounding revolution on the scale 43 when the direct signal is emitted, and remain closed at least until the effect of the direct signal upon the receiver will have ceased entirely. The contacts 47 must, however, be opened before the indicator reaches a point on the scale 43 at which depth the echo would normally be weaker than the direct signal. Since in the ordinary commercial installation this occurs at about 30 fathoms, it is usually convenient to have the contacts 47 open, say, at 15 fathoms in the sounding revolution, and to have them closed after the indicator has passed the full-scale mark. These contacts 47 serve to shortcircuit the secondary of transformer 3 providing the contacts 55 which are in series with 47 are closed. The circuit in question runs from upper contact 47 by way of conductor 79 to contacts 55; thence by way of conductors 80 and 71 to the secondary of transformer 3; and by way of conductor 81 back to lower contact 47. The contacts 55 are normally maintained closed by the spring 69 but are opened when the electromagnet 56 is energized. The electromagnet 56 is in the plate circuit of a vacuum tube 57. This circuit may be traced from the anode 59 through conductor 82 to relay coil 56 and conductor 75 to the positive side of the direct current supply. The negative side of the latter is connected by conductors 71 and 78 to the cathode 60 of the tube 57. The grid circuit of the tube 57 is connected to the secondary of transformer 64 whose primary is in the plate circuit of tube 12; thus any signal which serves to cut off the plate current of tube 12 and to operate the indicator, as explained above, also causes a high potential to be induced in the secondary of transformer 64 with the polarity shown. This potential is impressed upon the grid 58 making it more positive. Since a signal which is sufficient to produce an indication on 41 always induces a sufficient potential across the secondary of transformer 64, grid current will flow within the tube causing the condenser 22 to become charged and placing a negative bias upon the grid 58 in the same manner as previously described with reference to tube 4. Thus the plate current on tube 57 will be cut off and spring 69 will close contacts 55 unless the contacts 48 are closed. The contacts 48 serve to short-circuit the secondary of transformer 64 and are operated in exactly the same manner as contacts 47, that is they are open between the time the indicator passes, say, the 15 fathom mark in the sounding revolution and the full-scale mark, and closed at all other times.

With this arrangement it will be seen that the echo always operates to set the bias on condenser 9 regardless of whether the echo or the direct signal is the stronger. Assume that a sounding is being taken in shallow water below 15 fathoms. At this depth the echo may be depended upon to be stronger than the direct signal. Below 15 fathoms the contacts 47 and 48 are closed. The secondary of transformer 3 would initially be short-circuited if contacts 55 were also closed. However, since contacts 48 are closed, no potential can reach the grid of tube 57, and consequently the condenser 22 loses its charge so that the grid 58 is no longer negative and plate current builds up in the tube 57 and flows through the relay 56 opening the contacts 55. This removes the short-circuit from the secondary of transformer 3 and the echo coming in between zero and 15 fathoms, depending upon the depth, will operate the indicator 41. The echo, being within this depth range the strongest signal in the field, will serve to place a sufficient charge on condenser 9 and a consequent sufficient negative bias on the grid of tube 4 so that no signal of lesser intensity can operate the indicator; consequently the direct signal can not produce an indication.

At some depth deeper than 15 fathoms the echo and direct signal become equal in strength. In depths in which the echo is still of greater intensity than the direct signal it will be received in the usual manner since as the indicator passes the 15-fathom mark on the scale, the contacts 47 and 48 both open, permitting the echo to operate the indicator 21 and to build up a charge on the condenser 22 cutting off the plate current of tube 57 and deenergizing the relay 56, thus permitting the contacts 55 to close whereas in the arrangement according to Figs. 1, 1a, 3 and 4, shallow depths between zero and, say, five fathoms can only be obtained by operating a special switch.

Subsequently in still deeper depths the direct signal, even though stronger than the echo, can never actuate the indicator since both the contacts 47 and 55 are closed while the direct signal is being received at the microphone 1, thus short-circuiting the secondary of transformer 3 and preventing the direct signal from affecting the receiving circuit.

The present arrangement accordingly permits entirely automatic operation without any manual control other than closing the current supply switch. While in Fig. 5 the indicator is shown as a gaseous discharge tube, any other suitable form of indicator may be employed as, for example, a recorder.

A review of the operation of the present system may be helpful. This will best be understood from a consideration of the operation of Fig. 1.

In the first place, it may be remarked that the charges on the condenser are not dependent upon whether the signals are short or long since the time constants of the circuit are such that a signal of most any character will always produce its maximum potential effect. Assume that initially the condenser 9 is uncharged. In this case when energy is impressed upon the input transformer 3, the grid 5 is provided with a charge that is positive with respect to the cathode 8, and, further, under these conditions it follows that the left side of the condenser 9 is positive and the right side of the condenser negative. Ordinarily a small amount of grid current will flow and presumably plate current somewhere around the peak value if the IP curve is assumed. When the impression of the energy has ceased, this plate current will cease flowing and due to the charge on the condenser 9, the grid 5 will become negative with respect to the cathode 8 by an amount equal to the charge assumed by the condenser 9. This charge substantially remains on the condenser 9 except for the small leakage in the circuit, as indicated by the condenser 10 and the impedance 11, until disturbed by the energy that is next impressed upon the transformer 3. This charge may be assumed to be of a value in proportion to the signal impressed so that the next signal impressed, if of the same intensity as the initial signal, would place the circuit in substantially the same position that it was when initially operated. In other words, the negative potential would be substanially overcome and maximum plate current would again flow. If water noise or other energy of an intensity not equal to that of the previous signal were impressed, it would not be sufficient to overcome the bias provided by the previous signal and therefore a small amount of plate current would flow not sufficient to work through to the ultimate operation of the indicator.

If the water noise or some extraneous signal happened to be of a greater intensity than the signal itself, then it is true that an indication might be given and further than this, a negative bias might be set on the condenser 9 that would be of such a magnitude that the signal following might not operate the system. In such a case two or three indications might elapse before the system would again operate. This, however, is not a usual condition and has very rarely been experienced in actual practice.

It is believed that a consideration of the above discussion in connection with the diagram of Fig. 1 should make clear the operation of the circuit. It may be well to note that the current flowing in the grid circuit due to the impressed signal is not in the direction of grid current flow as usually connected with the diagram set forth in Fig. 2. The current due to the impressed signal flows from left to right through the condenser 9, whereas the ordinary grid current is thought of as flowing from the filament 8 to the grid 5.

Having now described my invention, I claim:

1. In a distance and depth measuring system, means for periodically emitting a compressional wave signal impulse, means for receiving the reflected impulses, an indicator, means for operating the indicator, and means acting upon said last-named means for automatically restricting the operation of said indicator during the time interval between any two consecutive reflected impulses to the indication of impulses having an intensity which is substantially equal to or greater than the intensity of the reflected impulse received at the beginning of said time interval.

2. Apparatus for recording or indicating in each of a series of successive time intervals the receipt, in a field of compressional wave energy impulses having various intensities, of the impulses having a peak value of intensity equal to or greater than the impulse of the highest peak value occurring during a preceding time interval, comprising a compressional wave energy receiver, a vacuum tube circuit, an indicator operated thereby, and means for negatively biasing one of the vacuum tubes in said circuit to a value determined in each time interval by the maximum intensity of the impulse having the greatest peak value received during said preceding time interval.

3. In a system for measuring distances and depths, a compressional wave energy receiving and indicating system including an indicator, a vacuum tube circuit for operating said indicator, said circuit having a vacuum tube with a control grid and a cathode, a condenser connected in series with said grid and adapted to be charged by the grid current flowing in said tube to a voltage corresponding to the peak voltage of the impulse of greatest intensity received, and a leakage path for said charge having a total conductance value not greater than the grid-cathode conductance of the tube.

4. In a system for measuring distances and depths, a compressional wave energy receiver, a transformer having its primary connected to said receiver, a vacuum tube circuit including a first vacuum tube whose grid-cathode circuit includes the secondary of said transformer, and a second vacuum tube having its grid connected to the plate circuit of said first tube and an output transformer connected in the plate circuit of said second tube, an indicator connected to the secondary of said output transformer and a condenser connected in series in the grid circuit of said first tube, and adapted to be charged by the grid current in said tube and when charged to place a negative potential on said grid, and a leakage path for said charge comprising solely the grid-cathode conductance of the tube.

5. A distance and depth measuring system comprising means for receiving compressional wave impulses in a medium in which signal and disturbing impulses are present, means for periodically emitting a compressional wave signal impulse of an intensity such that its reflection from the object whose distance is being measured has an intensity at the receiver greater than the intensity of extraneous disturbing impulses, an indicator, means for operating the same including a vacuum tube having a control grid and means responsive to a received reflected signal impulse for automatically negatively biasing said control grid to such a value that no current will flow in the output circuit of said tube except in response to a received impulse having an intensity not substantially less than the intensity of a previously received reflected impulse and for a period of time substantially equal to the period between successive signal impulses, whereby extraneous noises are prevented from actuating said indicator.

6. A distance and depth measuring system comprising means for emitting periodically a compressional wave signal impulse, means for receiving said impulse after reflection from the object whose distance is to be measured, an indicator and means for operating said indicator including a first vacuum tube and a second vacuum tube, each of said tubes having anode, cathode and control grid electrodes and attendant circuits therefor, means connecting the anode of said second tube to said indicator for operating the indicator in response to a current change in the anode circuit of said second tube including means for establishing a normal current flow therein, means for connecting the anode of the first tube to the control grid of the second tube and adapted to place a negative charge on the control grid of said second tube in response to a current flow in the anode circuit of said first tube and means operatively connected to the grid of said first tube for negatively biasing said grid to a potential determined by the intensity of reflected signal impulses received.

7. A distance and depth measuring system as in claim 6 in which said first vacuum tube has also a screen grid and means are provided for applying a potential to said screen grid sufficient to cause substantially maximum plate current to flow in said first tube at the grid voltage at which grid current begins to flow in said tube.

8. A distance and depth measuring system comprising means for periodically emitting a compressional wave signal impulse and means for receiving both the direct and reflected impulse, an indicator, means for operating the indicator in response to a received impulse, means for restricting the operation of the indicator to the indication of the strongest impulse received in each measuring cycle and means operatively connected to said emitting means for preventing the operation of the indicator by any received impulse during a portion of each measuring cycle.

9. A distance and depth measuring system comprising means for periodically emitting a compressional wave signal impulse and means for receiving both the direct and reflected impulses, an indicator, means for operating the indicator in response to a received impulse, means for restricting the operation of the indicator to the indication of impulses having at least the intensity of the strongest impulse received in the preceding measuring cycle, and means for preventing the direct impulse from actuating the indicator when the direct impulse is stronger at the receiver than the reflected impulse.

10. In a distance and depth measuring system having means for periodically emitting a compressional wave signal impulse, means for receiving the same after reflection from the object whose distance is being measured, an indicator, and a vacuum tube circuit connected to said receiving means for causing only the strongest received impulse to operate said indicator; means for preventing the direct signal from operating the indicator comprising means operatively associated with said periodic signal emitting means adapted to shortcircuit the input to said vacuum tube circuit during a portion of each measuring cycle.

11. In a distance and depth measuring system having means for periodically emitting a compressional wave signal impulse, means for receiving the same after reflection from the object whose distance is being measured, an indicator, and a vacuum tube circuit connected to said receiving means for causing only the strongest received impulse to operate said indicator; means for preventing the direct signal from operating the indicator comprising means for placing a negative biasing potential on one of the vacuum tubes in said circuit of a value large enough to prevent the flow of plate current in the tube during a portion of each measuring cycle upon the excitation of the receiving means by a signal having the intensity of the direct signal.

12. In a distance and depth measuring system having means for periodically emitting a compressional wave signal impulse, means for receiving the same after reflection from the object whose distance is being measured, an indicator, a vacuum tube circuit connected to said receiving means for causing only the strongest received impulse to operate said indicator and including a vacuum tube having cathode, anode, a first grid and a second grid elements, and means for placing a negative biasing potential on said second grid sufficient to prevent the flow of anode-cathode current in said tube during a portion of each measuring cycle upon energization of the receiving means by an impulse having the intensity of the direct signal.

13. In a system for the measurement of distances and depths including means for emitting a compressional wave signal impulse, means for receiving impulses, an indicator and means for selecting the received impulse of greatest intensity in the field during a measuring cycle to the complete exclusion of impulses of lesser intensity for operating the indicator comprising a vacuum tube having a grid, means for normally placing a negative bias on said grid of a value determined by the intensity of the received impulse of greatest intensity and means associated with said biasing means for excluding all impulses during a predetermined time interval after the emission of the signal impulse when the impulse reflected from the object whose distance is to be measured is not the impulse of greatest intensity in the field and occurs after the impulse of greatest intensity.

EDWIN E. TURNER, Jr.